United States Patent [19]
Nelson

[11] Patent Number: 4,985,106
[45] Date of Patent: Jan. 15, 1991

[54] INSULATION STRUCTURE FOR APPLIANCES

[75] Inventor: Thomas E. Nelson, Anchorage, Ky.

[73] Assignee: Soltech, Inc., Shelbyville, Ky.

[21] Appl. No.: 220,027

[22] Filed: Jul. 15, 1988

Related U.S. Application Data

[63] Continuation-in-part of Ser. No. 931,150, Nov. 17, 1986, abandoned, and a continuation-in-part of Ser. No. 177,439, Apr. 4, 1988.

[51] Int. Cl.$^5$ ............................................. B32B 31/00
[52] U.S. Cl. ..................................... 156/276; 52/809; 53/431; 53/452; 53/467; 53/469; 53/474; 134/58 S; 156/146; 156/227; 156/292; 312/229; 312/237; 312/242; 428/76
[58] Field of Search ............... 156/276, 146, 292, 227; 53/431, 469, 452, 474, 467; 428/76; 52/809; 312/229, 242, 237; 134/58 S

[56] References Cited

U.S. PATENT DOCUMENTS

| | | |
|---|---|---|
| 137,145 | 1/1944 | Koppel . |
| 174,534 | 4/1955 | Duncan . |
| 174,535 | 4/1955 | Duncan . |
| 1,880,153 | 9/1932 | Rosenzweig ........................... 52/809 |
| 1,923,195 | 8/1933 | Finck ..................... 52/809 |
| 1,949,677 | 3/1934 | Crawford . |
| 2,013,914 | 9/1935 | Hartmann . |
| 2,216,809 | 10/1940 | Derby . |
| 2,365,086 | 12/1944 | Kamowski . |
| 2,700,633 | 1/1955 | Bosenkerk ........................... 156/292 |
| 2,817,124 | 12/1957 | Dybirg . |
| 2,927,626 | 3/1960 | Corwin et al. ..................... 156/281 |
| 3,056,708 | 10/1962 | Ball ..................... 156/335 |
| 3,502,843 | 3/1970 | Stryer . |
| 3,730,144 | 5/1973 | Arberger . |
| 4,039,098 | 8/1977 | Stilts . |
| 4,269,890 | 5/1981 | Breitling et al. . |
| 4,282,279 | 8/1981 | Strickland . |
| 4,318,427 | 3/1982 | Cross .................................... 428/76 |
| 4,350,001 | 9/1982 | Shishoo ................... 53/431 |
| 4,372,028 | 2/1983 | Clark et al. . |
| 4,403,023 | 9/1983 | Reiss . |
| 4,447,377 | 5/1984 | Denton . |
| 4,477,399 | 10/1984 | Tilton . |
| 4,510,890 | 4/1985 | Cowan . |
| 4,739,781 | 4/1988 | Casoli ................................. 312/237 |

Primary Examiner—John J. Gallagher
Attorney, Agent, or Firm—Woodward, Emhardt, Naughton, Moriarty & McNett

[57] ABSTRACT

An insulation panel for an appliance for reducing one or more undesirable side effects due to the operation of the appliance such as noise, vibration and heat includes a first layer of enclosing material such as polyethylene or polypropylene which has greater tear resistance and configuring this first layer of enclosing material to a size and shape based upon the appliance and the area of the appliance to be covered. Next, a second layer of similar enclosing material is selected and configured so as to having a matching peripheral edge or contour with the first layer. Ultimately these two layers of enclosing material are joined together around their peripheral edges so as to define and completely enclose an interior cavity. Into this interior cavity a blanket of insulating material is dispersed of a generally uniform blanket thickness. In certain applications, the insulating material includes a binder so that the insulating material will not shift or settle relative to the enclosed cavity. The particular insulating material may either be selected for acoustical insulation, vibration dampening and/or thermal insulation. A singular purpose of the insulating material may be desired or multiple uses may be desired in which case part of the enclosed cavity may include acoustical insulation and part of the enclosed cavity may include vibration-dampening material.

24 Claims, 6 Drawing Sheets

INSULATION STRUCTURE FOR APPLIANCES

REFERENCE TO RELATED APPLICATIONS

This application is continuation-in-part application of my prior co-pending applications Ser. No. 931,150 filed Nov. 17, 1986, now abandoned, and Ser. No. 177,439 filed Apr. 4, 1988.

BACKGROUND OF THE INVENTION

The present invention relates in general in appliance insulation for dampening vibration, reducing noise and thermal protection; the assembly of such insulation to the appliance and methods of production of the assembled insulation. More specifically the present invention relates to insulation apparata and insulation arrangements for appliances such as dishwashers.

When used, either in, on or around various appliances, insulating pads, blankets and covers when formed from bats or mats of insulation material must be cut to a particular peripheral configuration which conforms to the shape and needs of the appliance to be insulated. On a production basis, this conforming to the shape and needs of the appliance requires the use of special cutting dies or similar techniques to somewhat accurately produce the desired pads or panels of insulation. The use of special cutting dies typically generates scrap material which cannot be used and thus adds to the cost of the finished product. A further problem with bats or mats of fibrous material, such as fiberglass, mineral fiber, ceramic fiber, and the like, is that during handling of the mats, small particulate matter (fibers) is released into the surrounding atmosphere. These small particles can cause irritation to the eyes, nose and throat of those individuals required to handle such material and to persons who are generally exposed to the material. Further health problems can also develop over time.

A further limitation of insulation material which comes off of large bats is that the shape is somewhat limited and frequently the most desirable insulation pad or panel for a particular appliance requires a unique or complex shape which cannot be readily made from the flat stock. For these applications, the insulating pads and panels are typically made using plastic foams or high-density molded fibrous insulation. However, plastic foams and molded fibrous insulation are relatively expensive as compared to the cost of bats or mats of flat insulation material.

A further problem with heretofore known insulation devices using a structure which has a cavity or pocket to be filled with insulation is that the insulation will tend to shift or settle leaving voids within the cavity or pocket. The prior art solution was to use bats or mats of insulation material in a bag-like structure and stitch the insulation to the bag walls. This is a time-consuming process requiring many stitch lines. It also results in adversely affecting the insulation capabilities along the stitch lines and causes holes to be made in the bag walls and insulation. Further, this attempted solution will not work with loose, discrete, divided insulation material.

A further concern with insulating appliances involves the manufacture, packaging, and installation. As should be evident from two examples, a hot water heater and a dishwasher, it will be understood that the ideal insulating technique is to fill tightly any voids or openings with an adequate amount of insulation so as to effect desirable vibration dampening, sound insulation and thermal insulation results. In a hot water heater this space is between the actual tank and the surrounding cabinet or tank wall. With regard to the dishwasher, this space is between the outer wall of the dishwasher enclosure and the inside surface of the kitchen cabinet or counterspace where the dishwasher is installed.

One aspect of the present invention has numerous practical applications for sealing and insulating between spaced-apart surfaces. A indicated in certain appliances such as hot water heaters an dishwashers, it is often desirable to have the insulation completely fill the void or area between spaced-apart surfaces for the vibration, noise and heat-transfer benefits. It is, however, difficult to install insulation within a space which is no larger in transverse dimension than the thickness dimension of the insulation which is to be installed therein.

In these applications, it is desirable to use a foam insulation material. Typically, the foam insulation material is injected in liquid form into the space between the surfaces and allowed to foam up in order to fill the space. It is, however, difficult to seal the space in order to confine the foaming insulation material and prevent the foaming insulation material from leaking out of the space to be insulated. In certain applications such as the under-the-counter dishwasher, the appliance must be removed for servicing and if locked in place within the kitchen cabinetry by foamed insulation, removal will be extremely difficult and reassembly even more so.

One aspect of the present invention involved the use of a thick section or panel of insulation which is enclosed within a pouch or bag to which a vacuum is applied. As the air is drawn out of the insulation, the insulation thickness decreases. The result is a very thick section of insulation reduced down to a substantially thinner section which can then be more easily installed in the space or cavity to be filled. When the vacuum is released and ambient air or even air under pressure is reintroduced into the pouch or bag, the insulation returns to its previous thick section configurations. This expansion back to a normal condition (of thickness) effectively fills the cavity or void and the process may be reversed when the appliance, such as the dishwasher, must be removed for servicing. With regard to the space between the inner tank and the outer shell of the hot water heater, this area for many years has been filled with a flat section of insulation material cut from a mat or bat and rolled around the inner tank. As previously explained, these thicknesses of mat insulation material should be of a thickness or width at least equal to the width of the space between the inner tank and the outer shell in order to provide optimum insulation results. However, this presents a problem when assembling the outer shell concentrically over the inner tank because the mat then physically interferes with the movement of the outer shell over the inner tank. Finally, as previously mentioned, home automatic dishwashing machines are typically installed in a confined space in kitchen cabinetry beneath the countertop. In order to reduce noise transmission generated by the mechanism of the dishwasher machine, it would be advantageous to install acoustical insulation between the dishwasher and cabinetwork. However, the space between the dishwasher machine and cabinetwork is so tight that to date it is virtually impossible to do so.

Since concern over vibration dampening (vibration insulation) and noise reduction (acoustical insulation) is a significant concern of consumers purchasing automatic dishwasher machines, efforts have been made, notwithstanding the tightness of the space or separation between the dishwasher enclosure and the cabinetwork to provide some form of insulation. This form of insulation typically consists of an outer blanket of flexible insulation such as urethane foam or fiberglass. In addition to acoustical insulation, vibration dampening insulation material may also be applied directly to the dishwasher structure to dampen machine vibrations so that they do not generate airborne noise to and thus become magnified by the cabinetwork and countertop. Since various makes and models of automatic dishwashers have slightly different structural and component location configurations, the specific places where noise absorbing and vibration dampening insulation materials need to be applied will vary. Typically though, some attempt is made to insulate the motor compartment as well as the pumping mechanism against noise and vibration. The outer insulation blanket which is typically used today constitutes the major component of the total dishwasher insulation package. This insulation blanket principally provides acoustical insulation but also functions as a sales feature wherein the size, degree or extent of insulation may be used as a grade or quality designation. It is important for this blanket of insulation to be durable in order to withstand assembly and packaging at the manufacturing plant. Further concerns as to the durability of the insulation blanket involve transportation to the appliance dealer and installation into the kitchen cabinet system at the home of the purchaser.

Most appliance manufacture package this type of appliance (automatic dishwasher) by placing the appliance in a corrugated container and then sliding tight-fitting corrugated or foam corner posts in each corner of the container and around the corresponding outer edges or corners of the appliance. With the insulation blanket draped around the appliance, this operation of inserting the tight-fitting corner posts can tear or dislodge the insulation blanket whether made from fiberglass or urethane foam.

In addition to concerns over how easily the insulation blanket may tear, either at the time of packaging for shipment to the dealer or when installed beneath the counter within the kitchen cabinetwork, there are health dangers due to handling of such fibrous material as well as irritation due to the airborne particles. It is generally well know that fiberglass and relates fibrous materials which are in particulate form or which are machined so as to give off airborne particles are objectionable both to handle and to work with due to irritation of the eyes, nose and throat.

A further concern as previously mentioned is that the manufacture wants a panel or layer of insulation as thick as possible but he also wants as large a dishwasher tub as possible for increased capacity. These two concerns are obviously not compatible with one another and since the cabinet opening for most automatic dishwashers is of a standard width, a balance must be struck between the dishwasher tub size and the thickness of insulation. The previously mentioned evacuation technique for reducing the thickness of the insulation at the time of installing and then allowing the thickness to resume to a thicker section is particularly valuable to satisfy the manufacturer's desires in this regard.

The present invention which incorporates a number of concepts and structures is particularly well suited to overcome each of the disadvantages and drawbacks with current appliance insulation concepts. The present invention discloses an enclosing structure which enables bat or mat as well as particulate insulation to be enclosed within a more durable pouch or bag so that the problems of insulation tearing during packaging and installation are minimized and handling problems and irritation problems are all but eliminated. A further advantage of the present invention is the ability to incorporate within the enclosed bag or pouch different types and compositions of insulation material such that acoustical absorption as well as vibration dampening may be simultaneously achieved by a single insulation pad applied to the appliance enclosure. This insulation filled bag or pouch is also ideally suited to the pulling of a vacuum as previously mentioned and thus also serves the purpose of creating a very thick section of insulation which can be reduced in thickness for the purposes of installation and then returned to the thicker section for enhanced acoustical absorption and vibration dampening.

SUMMARY OF THE INVENTION

An insulation panel for an appliance for reducing one or more undesirable side effects due to the operation of the appliance such as noise, vibration and heat, according to one embodiment of the present invention comprises a first layer of enclosing material having a peripheral edge of a predetermined shape, a second layer of enclosing material having a peripheral edge of a predetermined shape which is substantially the same as the peripheral edge shape of the first layer of enclosing material, an intermediate layer of loose, discrete insulation material disposed between the first and second layers, the first and second layers being joined together along their peripheral edges so as to define an enclosed cavity, the insulation material thereby being retained in the enclosed cavity and binder material dispersed in the enclosed cavity and cooperating with the insulation material so as to prevent the shifting of the insulation material within the enclosed cavity.

According to another embodiment of the present invention, there is disposed in combination an under-the-counter automatic dishwasher and an insulation panel which is cooperatively applied to the dishwasher for noise reduction wherein the insulation panel includes two layers of enclosing material which are joined around their peripheral edges so as to define an interior cavity and loose, discrete fiberglass material is disposed within the interior cavity.

According to yet another embodiment of the present invention, a method of fabricating an insulation panel for use on an appliance for reducing one or more undesirable side effects is disclosed. The method includes the steps of preparing a first layer of enclosing material, applying loose, discrete insulation material to that first layer, introducing a binder into the insulation material, preparing a second layer of enclosing material, laminating the second layer onto the insulation material and joining the edge peripheries of the first and second layers of enclosing material together so as define as enclosed cavity which encloses and surrounds the insulation material.

One object of the present invention is to provide an improved insulation panel which has general applicability to noise reduction, including appliances and specific applicability to automatic dishwashers.

Another object of the present invention is to provide an improved method of producing an insulation panel for use with appliances.

Related objects and advantages of the present invention will be apparent from the following description.

DESCRIPTION OF THE PREFERRED EMBODIMENT

Figure 1:
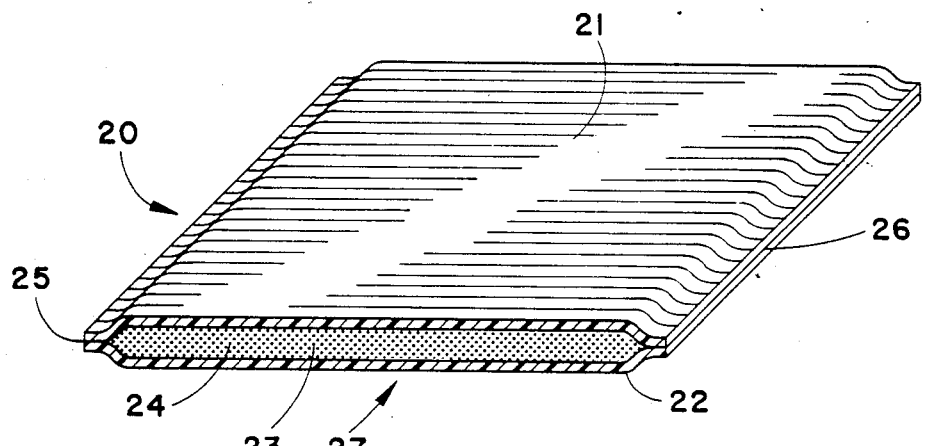
FIG. 1 is a perspective view of an insulation panel according to a typical embodiment of the present invention.

For the purposes of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated an insulation panel 20 which is assembled as a lamination from three layers of material. The first layer or upper surface is a sheet 21 of a fluid impermeable, pliable material such as, for example, polyethylene film, vinyl film, polyester film, metalized polyester, metal foil such as aluminum foil and the like. The third or lower surface is a sheet 22 of the same kind of material. Disposed between top sheet 21 and bottom sheet 22 is the primary insulation material 23 which in one embodiment (FIG. 5) is a loose, discrete, divided material having thermal and/or acoustical insulation or abatement properties. In a related embodiment (FIGS. 5A and 5B) insulation material 23 is bat or mat insulation. Some examples of suitable materials for insulation material 23 are insulating non-interengaged fiberglass, mineral wool, cellulose, ceramic fiber, beads of plastic foam, particles of lead and the like. The specific insulation material for insulation material 23 would be a function of the end use and the environment in which the insulation panel 20 is used. Similarly, the material selection for top sheet 21 and bottom sheet 22 will also depend somewhat on the environment in which insulation panel 20 is used.

With regard to the general nature and concept of panel 20, it may be informative to understand some of the ideas and needs expressed in my prior and copending application Ser. No. 931,150. Consequently, U.S. patent application, Ser. No. 931,150, filed Nov. 17, 1986 and entitled, "Insulation Device and Method of Making Same," is hereby incorporated by reference in its entirety for all of its various descriptions and discussions.

As will be described hereinafter in greater detail, a binder material may be dispersed throughout the mass of insulation material 23 in order to cohesively hold the insulation material together and prevent the insulation material 23 from shifting or settling within the cavity 24 which is defined by the top and bottom sheets, 21 and 22 respectively. The binder material used will be a function of the type of insulation material 23 and the environment in which the insulation panel is to be used. Further, the binder material can be a thermosetting adhesive, a thermoplastic adhesive, a cold setting adhesive, a room or ambient setting, or a hot setting adhesive. For example, the following is a list of appropriate binders for use with various types of insulation material 23 in order to produce insulation panel 20.

| Insulation Material | Binder |
| --- | --- |
| fiberglass | phenolic, sodium silicate |
| mineral wool | phenolic, sodium silicate |
| cellulose | polyvinyl acetate |
| sand particles | polyvinyl acetate |
| lead particles | polyvinyl acetate |

As will be explained in greater detail hereinafter, top sheet 21 and bottom sheet 22 are drawn from large rolls or sheets which are generally of the width indicated in FIG. 1. The insulation material 23, with or without the binder material is then dispersed on bottom sheet 22 and top sheet 21 is thereafter applied to complete the lamination. The interior cavity 24 which is defined by top and bottom sheets 21 and 22 is completely filled with the insulation material 23. Outer edges 25 and 26 are sealed closed thereby defining the width boundaries for insulation panel 20. The particular technique for sealing these outer edges may be varied depending on the material and the particular production equipment available. One technique is to use a roller arrangement and heat or a suitable adhesive and by confining the dispersion of insulating material 23 within sheets 21 and 22 so as to leave an edge or peripheral border free of insulation, the sealing of these edges can be effected.

It should also be understood that the leading edge 27 of the top and bottom sheets may also be sealed as the initial operation prior to dispersion of the insulating material onto the bottom sheet. In the illustration of FIG. 1, this leading edge has not been sealed for illustrative purposes in order to be able to illustrate the interior cavity 24, the filling of that cavity with insulation material 23 and the lamination of that insulation material by top and bottom sheets 21 and 22.

In a high-temperature application, it has been determined that an insulation panel fabricated from top and bottom sheets of a metal foil material which is then filled with discrete, divided fiberglass cohesively held together and adhesively attached to the top and bottom sheets with a sodium silicate binder has remarkable success as a thermal insulating device.

Figure 2:
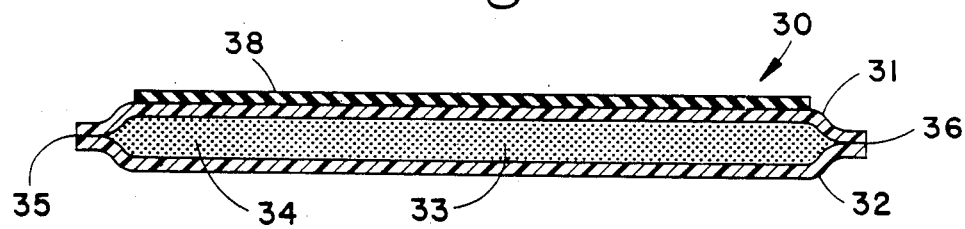
FIG. 2 is a front elevational view in full section of the FIG. 1 panel with a pad of vibration-dampening insulation material applied.
Figure 3:
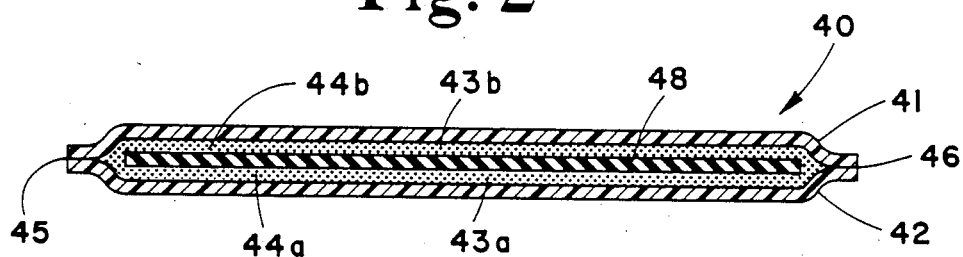
FIG. 3 is a front elevational view in full section of the FIG. 1 insulation panel with a barrier pad of vibration-dampening insulation material disposed in the interior cavity.
Figure 4:
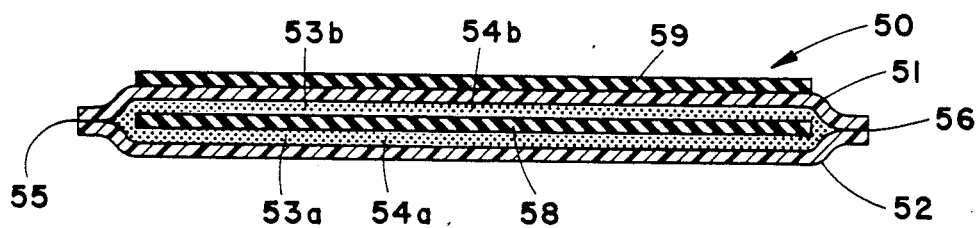
FIG. 4 is a front elevational view in full section of the FIG. 1 insulating panel including one barrier pad of vibration-dampening insulation material disposed on the exterior of the panel and a second barrier pad disposed on the interior of the insulation panel.

Referring to FIGS. 2-4, there are illustrated other arrangements for insulation panels according to the general principles and construction as described for FIG. 1. While the specific lamination configuration of FIGS. 2-4 are generally related, each figure depicts a particular lamination of vibration dampening and sound absorbing insulation materials which for the first time provides the efficiency and convenience of addressing both acoustical and vibrational concerns in a single prefabricated and specifically styled and contoured insulation panel. At this point, the particular peripheral geometry or contour is not discussed, only the lamination configuration and the materials which are used in that lamination.

Specifically, referring to FIG. 2, there is illustrated an insulation panel 30 which includes a top sheet 31, a bottom sheet 32, primary insulation material 33 disposed within interior cavity 34 which is created by sheets 31 and 32. Outer edges 35 and 36 are sealed as is the leading and trailing edges of insulation panel 30 such that the finished panel is completely enclosed on the top, bottom and all four edges. Top sheet 31 and bottom sheet 32 may be constructed of any of the materials previously mentioned for top and bottom sheets 21 and 22. In the preferred embodiment, sheets 31 and 32 will be constructed from polyethylene film, PVC film, or polypropylene film. It is important that the film selected by pliable, compatible with the insulation material 23 and able to be sealed along the side edges 35 and 36 as well as along the leading and trailing edges by either an adhesive application along those edges or by heat sealing so as to create a completely enclosed insulation panel.

The primary insulation material 33 which is disposed within interior cavity 34 is selected for the purposes of acoustical insulation or sound absorption. For the purposes of vibration dampening, vibration barrier material insulation configured as a pad 38 may either be applied to the top outer surface (FIG. 2) of top sheet 31, or to the inside surface of top sheet 31 (not illustrated). This barrier insulation material pad 38 is adhesively joined to top sheet 31 or yet another alternative may be to dispose it within interior cavity 34 (as illustrated in FIG. 3). Appropriate dampening vibration materials insulation for the barrier pad 38 include loaded vinyl, loaded asphalt, and asphalt impregnated felt. When the barrier material pad is not directly applied to the vibrating surface, it may be thought of more as a transmission vibration barrier (see FIG. 3)

As should be apparent from the foregoing descriptions and from the background of the invention discussion, insulation pads 20 and 30 are to be applied on, to an around appliances such as automatic dishwashers in order to provide adequate sound absorption and vibration dampening. The specific placement of the insulation panels will depend upon the brand and model of dishwasher, though the advantage of the present invention is the ability to prefabricate all necessary insulation panels such that they may simply be applied easily and directly at the time of manufacture and/or may be replaced as needed by repair or service personnel.

Top and bottom sheets 21 and 22 as well as 31 and 32 have been described as coming off a large roll of a fixed width. It should be understood that these polyethylene type sheets or films may be obtained in a variety of lengths and widths and may be cut to any particular shape or contour. Similarly, the initial size of the sheets is selected so as to permit an adequate edge border for the purposes of sealing the top and bottom sheets so as to define the interior cavity. As would be expected, the thicker the cavity which is desired, the greater amount of material which will have to be left on the border so as to bend and form the sealing edge flanges while at the same time extending above and below those flanges to create the desired cavity thickness. This need for additional edge clearance is evident from the FIG. 3 illustration which requires a thicker or deeper interior cavity such that the same amount of insulation material may be disposed within that cavity but in addition the cavity is also able to accept a pad or strip of barrier vibration material insulation for vibration dampening. If still more insulation was desired or thicker or additional sections of barrier material, the edge clearance of the top and bottom sheets would have to be that much greater.

Referring more specifically to FIG. 3, there is illustrated insulation panel 40 which includes top sheet 41 and bottom sheet 42. As previously described, these top and bottom sheets may be of any suitable film material such as polyethylene, PVC or polypropylene. Due to the fact that a pad 48 of vibration barrier insulation material insulation panel 40 between the top and bottom sheets, there are in effect upper and lower portions of primary insulation material, and these are identified as primary insulation material 43a which is below the barrier pad 48 and 43b which is the primary insulation material above the pad. These upper and lower portions of insulation material completely fill the corresponding interior cavities 44a which is the lower cavity and 44b which is the upper cavity. As before, the outer peripheral edges of the insulation panel 40 are sealed and while only outer edges 45 and 46 are illustrated, it is to be understood that the leading and trailing edges are similarly sealed by drawing together the outer film flanges and either adhesively or by heat joining those flanges of the top and bottom sheets together. While the leading edge is sealed initially prior to the application of the insulation material, the trailing edge will be sealed whenever the desired length of insulation panel has been fabricated. Depending upon the appliance and the intended use for the insulation panel, the overall length may vary as may the contour as will be described hereinafter.

In view of the fact that the laminated construction of insulation panel 40 creates an upper and lower interior cavity, it is possible to vary the nature of the primary insulation materials 43a and 43b which are used to fill those cavities. Again, depending on the specific application and the specific appliance, it may be desired to put insulation material of different densities in the two cavities, depending upon the specific acoustical results desired.

With regard to the vibration barrier insulation material which is configured as barrier pad 48, this material is a vibration dampening insulation material or transmission barrier and as previously described with regard to FIG. 2, may be loaded vinyl, loaded asphalt, or asphalt impregnated felt.

Referring to FIG. 4, a still further lamination arrangement for the insulation panel concept of the present invention is illustrated. Insulation panel 50 is virtually the same as insulation panel 40 with the lone exception that insulation panel 50 includes two vibration dampening barrier pads of vibration insulation material, either of which or both may be a transmission barrier. Otherwise, insulation panel is of a similar construction in that it includes top sheet 51, bottom sheet 52, insulation materials 53a and 53b which are arranged in lower interior cavity 54a and in upper interior cavity 54b and outer edges 55 and 56. Interior barrier pad (transmission barrier) 58 is of a suitable dampening material to reduce vibration and exterior barrier pad 59 may be of a similar vibration dampening insulation material.

As previously indicated in the two-cavity configuration of FIGS. 3 and 4, the insulation materials which are disposed in the cavities may be different materials since there are in fact two interior cavities. Likewise, barrier pads 58 and 59 may be of different insulation materials and may be of different thicknesses and configurations.

As should be understood, the method of fabrication for the types of insulation panels described in FIGS. 2–4 includes the initial laying down of the bottom sheet which then receives an application of the insulation material which may be applied from a bat or mat or as particulate with or without a binder. If nothing further is to be disposed within the interior region, then the top sheet is installed, the edges closed and the panel completed. When a vibration barrier pad of insulation material is to be disposed within the enclosure formed by the top and bottom sheets, that barrier pad is applied next and directly onto the lower level of primary insulating material. Following positioning of the barrier pad, the second or upper layer of primary insulation material is applied, again with or without a binder, and the final top sheet is applied and the edges sealed closed. Following the completion of the enclosing of the insulating panel, the exterior barrier pad is adhesively joined to the outer surface.

The construction of insulation panels as illustrated in FIGS. 1–4 solves all of the aforementioned concerns and disadvantages with appliance insulation. The handling and contact concerns over fiberglass are eliminated by the encasement of that fiberglass insulation or fiberglass particles by the polyethylene film sheets which comprise the top and bottom sheets of each panel. There is not any fiberglass particulate matter which is airborne nor any handling. Both acoustical insulation and vibration dampening insulation materials can be assembled together and the particular shape of the finished panel can be selectively configured for a particular make and model of appliance. Finally, using a tougher, more-durable film such as polyethylene or polypropylene, the concerns over tearing of the insulation during packaging, shipment and installation are virtually eliminated. The flimsy, tear-prone insulation pads or blankets of the past are replaced by a durable and tough enclosed insulation panel without sacrificing any sound absorption properties.

Figure 5:
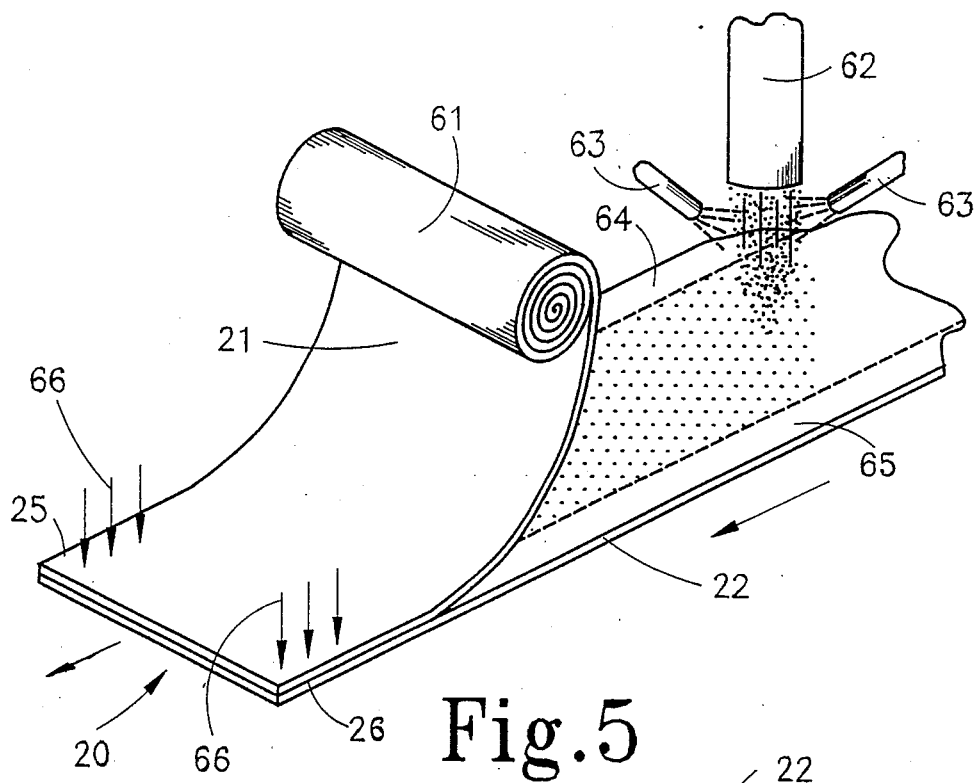
FIG. 5 is a diagrammatic, perspective view of a manufacturing process which is suitable for production of the FIG. 1 insulation panel using particulate reducing material.

Referring to FIG. 5, the automated process for the lamination and assembly of one style of insulation panel 20 is illustrated. The FIG. 5 illustration utilizes particulate material 23, while FIGS. 5A and 5B utilize bat and mat insulation, respectively. Top sheet 21 of polyethylene film is drawn off of a larger roll 61 as is bottom sheet 22, though its supply roll is not illustrated. As bottom sheet 22 moves along a conveyor or similar flow path insulation material 23 is deposited from hose 62. If a binder (adhesive) is going to be applied to the insulation material as it is deposited on bottom sheet 22, then this adhesive is interspersed into the insulation material coming from hose 62. These adhesive nozzles are identified as nozzles 63. As is intended to be illustrated, the insulation material is deposited down the middle of bottom sheet 22 leaving edges or edge boundary areas 64 and 65 free of insulation material. As top sheet 21 is applied as a lamination over the insulation material and on top of bottom sheet 22, the edge boundary areas of sheets 21 and 22 are sealed. This sealing operation is diagrammatically represented by arrows 66 and as previously indicated, this edge-sealing operation may be done adhesively or by heat.

Figure 5A:
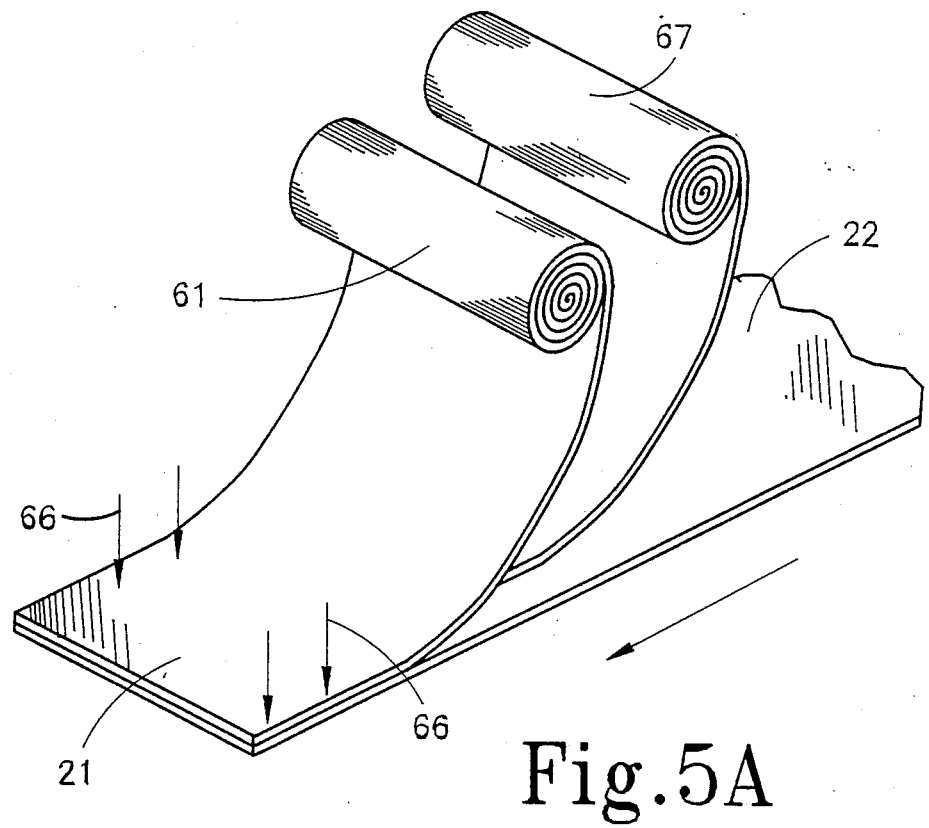
FIGS. 5A and 5B are diagrammatic, perspective views of manufacturing processes suitable for production of the FIG. 1 insulation panel using bat and mat insulation material.
Figure 5B:
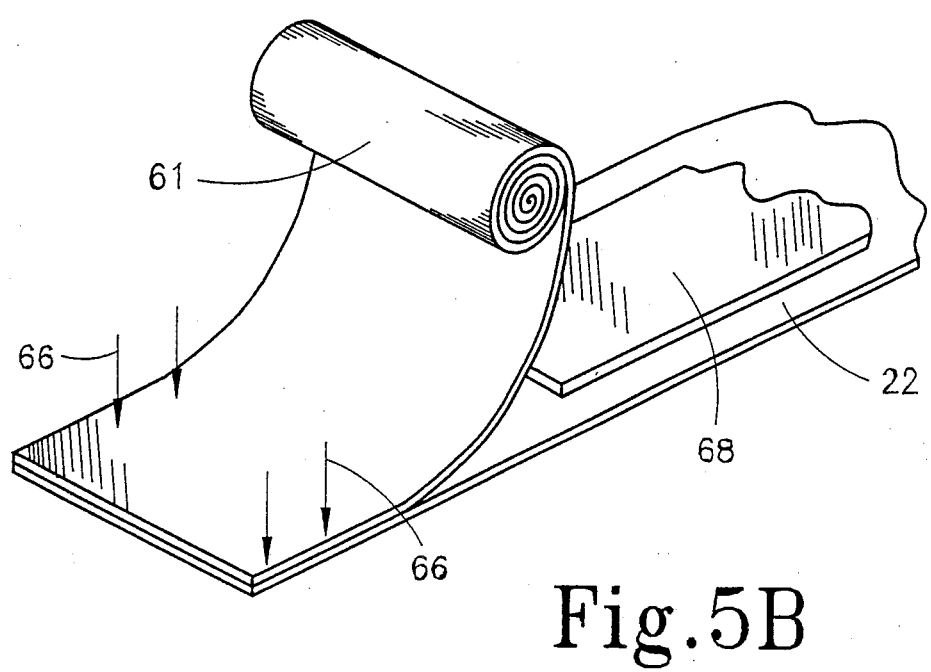

Referring to FIG. 5A, it is virtually identical in manufacturing concept to FIG. 5 except that hose 62 and nozzles 63 are replaced with a rolled bat of insulation material 67. As before, this bat insulation is applied in a width slightly less than the width of top and bottom sheets 21 and 22. This allows the edges to be sealed so as to completely enclose the strip of bat insulation. With reference to FIG. 5B, a precut mat 68 of insulation is used, such as fiberglass which may be cut from a larger roll or bat. In both FIGS. 5A and 5B, the bat or mat insulation may be applied without adhesive or may be adhesively joined to either sheet, typically bottom sheet 22. Additionally, other insulation may be still be added, under, over or around the mat and bat insulation.

Figure 6:
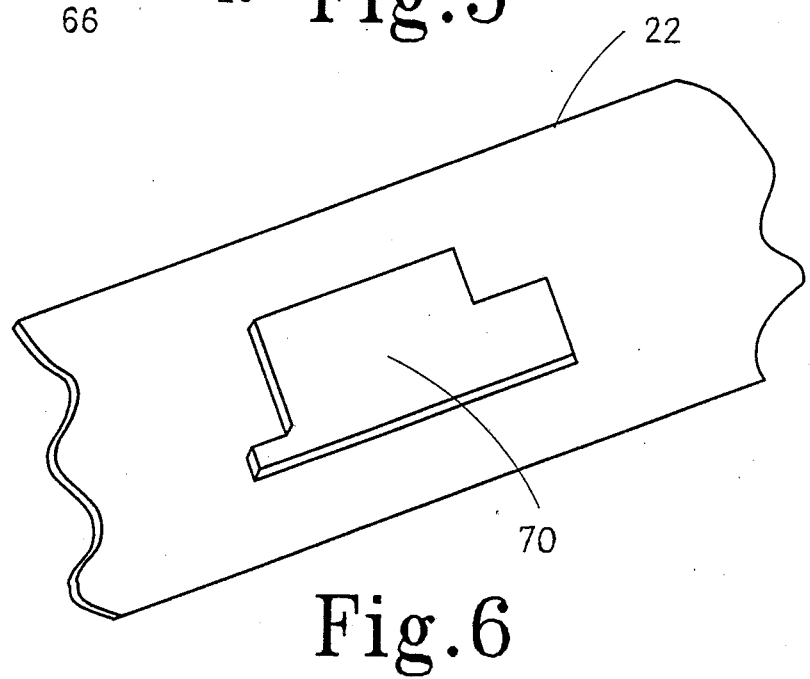
FIG. 6 is a partial, diagrammatic, perspective view of an insulation panel bottom sheet with a particular shape of insulation material disposed thereon.

Referring to FIG. 6, a unique capability of the present invention is illustrated. As bottom sheet 22 flows along its assembly path as illustrated in FIG. 5, the present invention enables a vibration barrier pad 70 of insulation material and of a specific and preselected size and contour to be applied directly to bottom sheet 22. Insulation material 23 has been omitted from the FIG. 6 illustration for the purposes of making it clear that the vibration barrier pad 70 may either go on top of insulation 23 or may go directly against the bottom sheet 22 in which the case the insulation material would be disposed solely on top of vibration barrier pad 70.

The insulation panel being created is designed to be used on a particular appliance in a particular location where there is a particular vibration problem. It may be an area of motor, blower or pump or it may be a unique problem associated with the overall support and structure of the appliance. Whatever the particular cause or reason for the vibration, the insulation panel concept of the present invention enables a pad of vibration-dampening insulation material to be selectively placed and incorporated within the acoustical absorption insulation material such that when the insulation panel is applied to the appliance at the desired location, vibration-dampening is automatically achieved without the need for multiple assembly steps and multiple insulation and dampening panels being created.

In the preferred embodiment, the insulation panel of the present invention is used for an automatic dishwasher which was specific acoustical insulation needs and certain vibration dampening needs. There may also be thermal insulation requirements in which case the particular primary insulation material selected or the vibration barrier insulation material selected may include thermal properties which would be adequate for the particular problem. Alternatively, taking FIG. 4 as an example, barrier pad 58 could provide the vibration dampening needs while barrier pad 59 which is disposed on the outside surface could provide the thermal insulation requirements.

Figure 7:
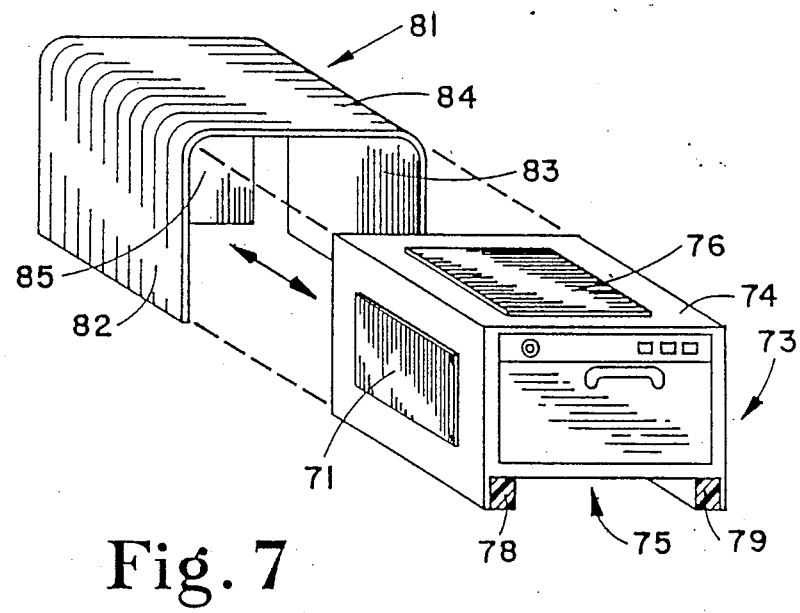
FIG. 7 is an exploded, perspective view of an automatic dishwasher and insulation panel prior to assembly of the panel to the dishwasher and prior to assembly of the dishwasher into a cabinetwork opening.

Referring to FIG. 7, an automatic dishwasher prior to installation beneath the countertop within the cabinet-work of a kitchen is illustrated. The automatic dishwasher is illustrated as including motor compartment insulation, vibration dampening material pads applied to the diswasher enclosure and a blanket of insulation 81 which is a T-shaped member having a top, sides and a back panel and this blanket insulation is constructed according to the teachings of FIG. 1 of the present invention. However, it is also to be noted that the panel construction as illustrated by FIGS. 2-4 could also be employed for the construction of the surrounding insulation blanket.

With specific reference to FIG. 7, there is illustrated automatic dishwasher 73 which includes enclosure 74 which may be sheet metal or plastic and motor compartment 75. For illustrative purposes barrier pads 76 and 77 of vibration dampening insulation material are illustrated as being applied to the top and side of the dishwasher with sound insulation strips 78 and 79 being positioned on opposite sides of the motor compartment. The blanket insulation 81 includes insulation side panels 82 and 83, a top insulation panel 84 and a rear insulation panel 85.

It is to be understood that insulation blanket 81 slides over and around automatic dishwasher 73 so as to provide acoustical insulation adjacent the sides, top and rear wall portions of the automatic dishwasher. It is also to be understood that barrier pads 76 and 77 may be built into insulation blanket 81 as previously described and as further illustrated in FIG. 8.

The previous description of the various insulation panel options for the present invention detail each such panel as a generally rectangular panel whose width was fixed and length variable as the panel is produced from rolled sheets of polyethylene film. The presence of rear insulation panel 85 as an integral part of insulation blanket 81, indicates that top and bottom sheets for the particular insulation panel are not restricted to solely rectangular shapes. While it is true that to create the light sided block-T-shaped insulation blanket, particular contouring and cutting must be done, the fact remains that the entirety of the insulation blanket including all four panels may still be fabricated in the identical manner described and illustrated in FIGS. 1-4.

Figure 8:
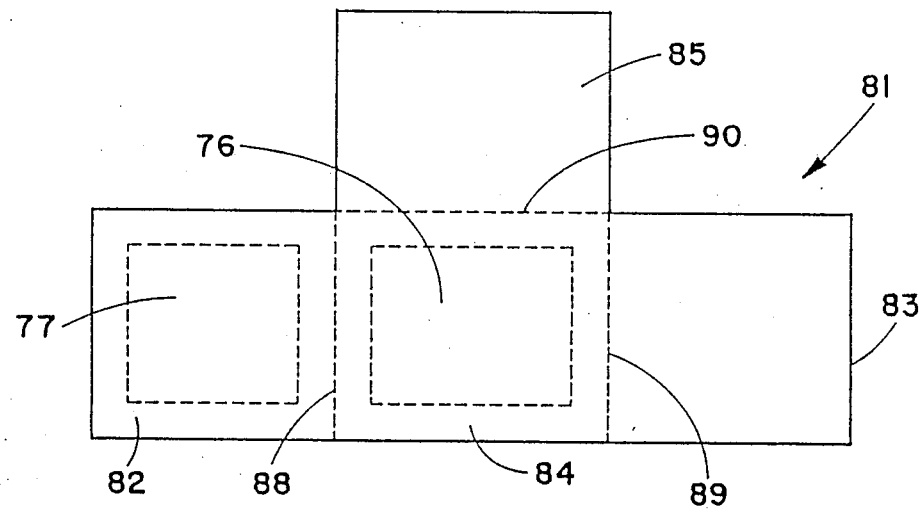
FIG. 8 is a top plan view of the FIG. 7 insulation panel with the diagrammatic addition of barrier pads of insulation material.

Referring to FIG. 8, the unfolded and laid-flat insulation blanket 81 is illustrated. This blanket has been drawn with fold lines 88, 89 and 90 so as to establish the separation between left and top insulation panels, the right and top insulation panels and the top and rear insulation panels. These particular fold or partition lines which are indicated by broken lines may simply be folds in the panel or may be lines which are heat-welded so as to define discrete pouches for the insulation material wherein each side panel or portion is a separate and distinct insulation panel. Heat welding of these seams creates a type of living hinge which facilitates placement of the insulation blanket around the dishwasher and makes it clear as to where the fold lines should be so that the left and right side panels and the top and rear insulation panels conform properly to the dishwasher.

Also illustrated in FIG. 8 are vibration barrier pads 76 and 77 as laminated into the top insulation panel 84 and the left side insulation panel 82, respectively.

It should also be understood that the entirety of the outer edge periphery of insulation blanket 81 as illustrated in FIG. 8 is sealed in the manner described for FIGS. 1-4 such that the acoustical insulation disposed between the top and bottom sheets is completely enclosed.

Having described the basic insulation panel lamination construction and the manner in which these insulation panels may be utilized with appliances, and having described various materials and lamination options, there are a few further characteristics of the present invention which may be utilized, depending upon the particular construction preferences and the particular application. For example, in lieu of mixing the binder with the particulate insulation and depositing that mixture directly onto the bottom sheet, it is possible to place a layer of adhesive directly on top of the bottom sheet and then disperse the insulation particulate matter onto the adhesive. Regardless of the particular approach, it is desirable to employ adhesive at some stage so as to prevent the particulate matter from shifting. The ability to use particulate matter such as fiberglass provides an efficient and cost-effective approach since the particulate which is used may include scrap material and remainders which are not of sufficient size for any other purpose. It is also possible to employ the polyethylene top and bottom sheets so as to enclose bat insulation or a mat insulation in accordance with the teachings of this invention. The bat (or mat) insulation may be laminated loosely or may be secured in place by the use of a suitable adhesive.

While there are various techniques to apply the insulation blanket around the dishwasher, one prefabrication concept includes the use of double-sided adhesive applied directly to the polyethylene material of the top and bottom sheets. When the blanket is ready to be applied to the dishwasher, the cover paper is peeled away and the insulation blanket stuck directly to the appliance.

A further feature of the present invention and one which has been previously commented upon involves the concept of using thick sections of insulation so as to completely and tightly fill spaces or cavities existing either within the particular appliance (hot water heater) or between the appliance and the surrounding environment (automatic dishwasher). Consider for example, a desire to use the insulation panels of the present invention where their convenience, simplicity, unique configuration which includes both acoustical insulation and vibration dampening within a single insulation pad and which provides the much-needed tear resistance. Also consider that the space between the exterior of the dishwasher and the interior surface of the opening created below the kitchen counter needs to be tightly filled with insulation to the greatest degree possible both for a snug fit of the dishwasher within the prepared opening and for optimum acoustical insulation and vibrational dampening.

If a very thick section of insulation is attempted to be applied to this separation between the cabinet opening and the dishwasher it will almost assuredly tear or roll up as the installer slides the dishwasher into the standard opening. The polyethylene encasement concept which creates the insulation panels of the present invention will aid greatly in reducing the tendency to tear or roll up in that it provides a stronger and more durable insulation panel. However, even the polyethylene film for the top and bottom sheets may not withstand a forced interference fit when the thickness of insulation is noticeably more than the transverse dimension of the clearance space between the cabinet opening and dishwasher.

A similar concern exists with the thermal insulation applied around hot water tanks. Since the outer cylindrical case or cover must slide down vertically, if the insulation roll around the tank is much larger than the distance of separation of clearance space, the outer housing will interfere and tear or roll up the insulation thereby destroying the insulation and defeating the acoustical insulation and vibration dampening properties it was intended to provide.

With regard to hot water heater/insulation designs, dishwasher insulation and the drawing of a vacuum to reduce some of the ideas and needs expressed in my prior and copending application, Ser. No. 177,439. Consequently, U.S. patent application Ser. No. 177,439, filed Apr. 4, 1988 and entitled, "Method of Sealing and Insulating Space Between Spaced Apart Surfaces," is hereby incorporated by reference in its entirety for all of its various descriptions and discussions.

One aspect of the present invention which enables very thick sections of insulation to be incorporated into a final assembly while at the same time not tearing or rolling up during installation is a vacuum technique which draws the air out of the particulate insulation enabling the thickness of the insulation panel to be substantially reduced thereby easing installation. Once installation is completed then the vacuum drawn on the insulation panel is removed and as atmospheric air enters the insulation panel it is permitted to return to its normal thickness. As air enters the pouch or bag housing the insulation, that pouch expands and as a result tightly seals the space or cavity existing either within the appliance or between the appliance and its surrounding and enclosing cabinet work.

This particular vacuum process will not be described in greater detail with regard to hot water heater construction. It is to be understood that a similar process technique is equally applicable to the insulation panels previously illustrated and described and used with a dishwasher. It should also be understood that in order to take advantage of the vacuum concept so as to draw the air out of the insulation pouch when particulate insulation is used, it is necessary that any binder which is used be set-up or cured prior to pulling the vacuum. When bat insulation is used without adhesive or adhesive on only one side, the vacuum can be drawn to reduce the thickness without concern.

Figures 9, 10:
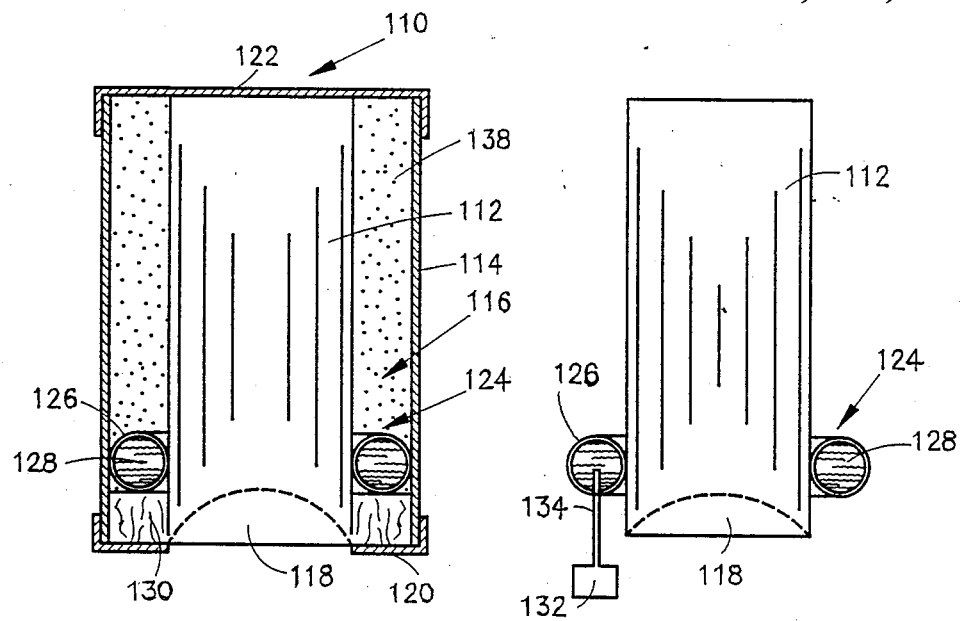
FIG. 9 is a diagrammatic representation in cross-sectional view of a water heater device with a sealing and insulating device in place.
FIG. 10 is a diagrammatic representation in cross-sectional view of one step in the process of achieving the FIG. 9 configuration.

Referring to FIG. 9, a conventional-type hot water heater 110 is schematically illustrated. Hot water heater 110 includes an inner water tank 112 for containing water and an outer shell 114 which is concentrically configured so as to surround the inner water tank 112. The outer shell 114 and inner water tank 112 cooperate so as to define an annular space 116 therebetween. As shown, the hot water heater 110 is of the gas fired type having a combustion chamber 118 located at the bottom end of the interior water tank 112. A combustion or gas burner (not shown) is located within the combustion chamber 118. The bottom of the annular space 116 can be closed by a bottom wall 120, and the top of the water heater 110 is closed by a top wall 122.

With continued reference to FIG. 9 and additional reference to FIGS. 10–13, a sealing and insulation device 124 is positioned within the annular space 116 in abutting contact with the first or exterior surface of the water tank 112 and the second or interior surface of outer shell 114. The sealing and insulation device 124 is shown in FIGS. 10–13 as comprising a closed, elongated envelope 126 fabricated of a resilient, gas impermeable material. The material can be, for example, a thermal plastic film such as polyethylene film or polypropylene film. Enclosed envelope 126 is filled with a resilient insulation material 128 such as interengaged or non-interengaged fibrous material, for example, fiberglass, mineral wool, cellulose, ceramic fiber, or divided, discrete particles of a material, for example, beads or plastic foam, oil resilient flexible foam, for example, a flexible urethane foam. The specific insulation material used will be a function of the end use and environment. The length of the envelope 126 of the insulation device 124 is sufficient to circumscribe the annular space 116 with the ends of the envelope 126 in neutral end-to-end or overlapping abutment. The thickness or width dimension of the envelope 126 is at least equal to the transverse dimension of the space 116 so as to be in abutting contact with both the exterior surface of the water tank 112 and the interior surface of the outer shell 114 across the space 116.

Figures 11, 12:
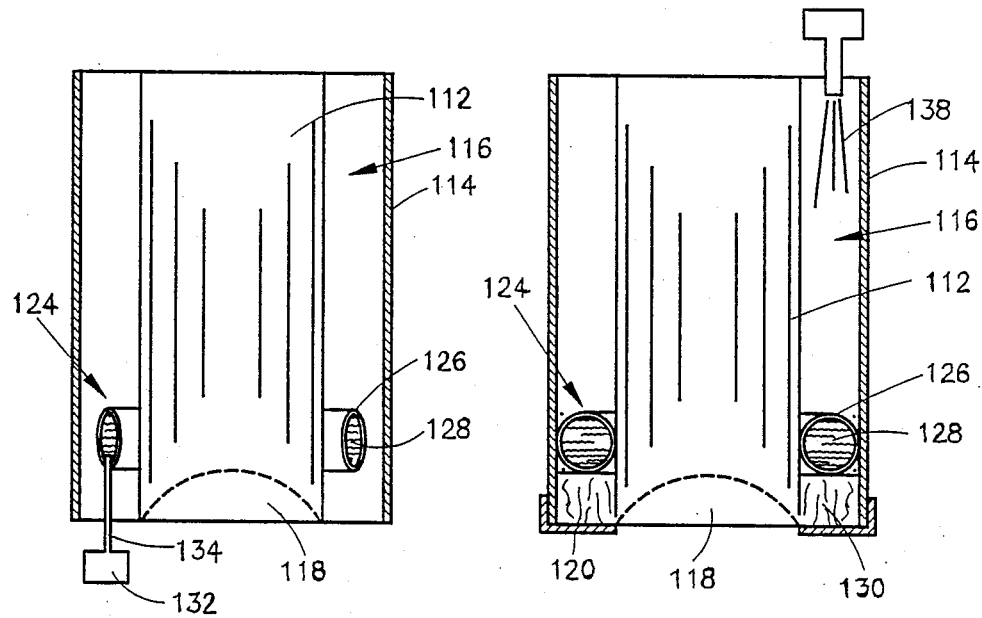
FIG. 11 is a diagrammatic representation in cross-sectional view of another step in the process of achieving the FIG. 9 configuration.
FIG. 12 is a diagrammatic representation in cross-sectional view of yet another step in the process of achieving the FIG. 9 configuration.

Now with reference to FIGS. 10–12, in the assembly of the hot water heater 110, the sealing and insulating device 124 is positioned on the first surface or exterior surface of the inner water tank 112 at a preselected location thereon. For example, as shown, the sealing and insulation device 124 is wrapped around the circumference of the inner water tank 112 at a location just above the combustion chamber 118. The circumscribed envelope 126 is fastened to the exterior surface of the water tank 112 to prevent it from moving. This can be done using, for example, an adhesive or tape. If the sealing and insulation device 124 is located above the combustion chamber 118, a mat of insulation material 130 of fire-resistant material should be located within the space 116 below the sealing and insulation device 124 circumscribing the combustion chamber 118. Next, air is evacuated from the interior of the sealing and insulation device 124 in order to shrink and reduce the thickness of the sealing and insulation device 124 to a dimension less than the width of the space 116 between the first or exterior surface of the water tank 112 and the second or interior surface of the outer shell 114. The removal of the air can be accomplished by using a vacuum pump 132 which may be for example a household vacuum cleaner. The vacuum pump 132 has a flexible hose 134 with, for example, a piercing needle at the free inlet end thereof for piercing the envelope 126 of the sealing and insulation device 124. The free inlet end of the hose 134 is pressed against the sealing and insulation device 124 so the needle pierces the envelope 126 establishing gas communication between the inlet end of the hose 134 and the interior of the envelope 126. When the vacuum pump 132 is activated, air is removed from the interior of the sealing and insulation device 124 which causes the envelope 126 to shrink in at least the width to a dimension less than the transverse dimension of the space 116. The outer shell 114 is then positioned coaxially over the inner water tank 112 so that the second or interior surface of the outer shell 114 is in a spaced-apart relationship to the first or exterior wall surface of the water tank 112.

The vacuum pump can be reversed or the hose 134 can be connected to an air pump to introduce air back into the envelope 126 or the inlet end of the vacuum pump hose 134 is removed for engagement with the sealing and insulation device 124 allowing ambient air to re-enter the envelope 126 of the sealing and insulation device 124 through the pierced hole therein in order to recover compressively or swell the sealing and insulation device 124 back to at least its original size such that it is in abutting contact with both the exterior surface of the water tank 112 and the interior surface of the outer shell 114 across the space 116 therebetween circumferentially of the space 116.

The annular space 116 above the sealing and annular insulating device 124 is filled with an expanded foam insulation material 138 such as urethane, polyethylene, polystyrene and the like. Expandable foam insulation material is injection or otherwise placed in the annular space 116 above the sealing and insulation device 124 and allowed to expand in place filling the annular space 116 above the insulation device 124. The abutting contact of the sealing and insulation device 124 with the exterior surface of the water tank 112 and the interior surface of the outer shell 114 resists the pressure generated by the expanding foaming material 138 and seals across the space 116 to prevent leakage of the foam material past the sealing and insulation device 124 as it is expanding in the space 116 above the sealing and insulation device 124. Thus, the sealing and insulation device 124 functions to insulate the portion of the space 116 in which it is located and also functions as a seal or stop for the expanding foam material 138 from leaking past the sealing and insulation device 124.

It is contemplated that the sealing and insulation device 124 could be positioned on the interior surface of the outer shell 114, then evacuated of air and next the water tank 112 would be positioned coaxially within the outer shell 114 in space-apart relationship to define the space 116. Air is then allowed to re-enter the envelope 126 of the sealing and insulation device 124 swelling the sealing and insulation device 124 back to at least its original size such that it is in contact with both the exterior surface of the tank 112 and interior surface of the shell 114.

It is further contemplated that an alternative sequence of steps to those discussed above could also be followed. Still with reference to FIG. 9, the outer shell can be positioned coaxially over the inner water tank so that the second interior surface of the outer shell is in spaced-apart relationship to the first or exterior wall surface of the water tank. Air is then evacuated from the interior of the sealing and insulation device 124 which causes the envelope 126 to shrink in at least the width dimension to a dimension which is less than the transverse dimension of space 116. The sealing and insulation device 124 is then positioned in space 116 and when correctly in position a vacuum pump which was used to evacuate the device can be reversed or the hose 134 can be connected to an air pump to introduce air back into the envelope 126. Alternatively, ambient air can be allowed to re-enter the envelope 126 through the pierced hole therein in order to swell the sealing and insulation device 124 back to at least its original size such that it is in abutting contact with both the first or exterior surface of the water tank 112 and the second or interior surface of the outer shell 114 across space 116. The expandable foam insulation material 138 is then introduced into the annular space 116 and allowed to expand in place.

With continued reference to the foregoing sequence of steps, it is further contemplated that in some situations it will not be necessary to seal the pierced holes in the sealing and insulation device 124 after the air has been evacuated and the hose removed because the holes are small enough to retard the flow of ambient air into the sealing and insulation device 124. If the holes are sufficiently small there will be adequate time for the sealing and insulation device 124 to be installed in the space 116 before it fully expands back to its original size.

The foregoing description which was applied with regard to a hot water heater is equally applicable to the preferred embodiment of the present invention which encompasses completely enclosed insulation panels of virtually any preselected size and shape such that the panel designed with the desired compliment of acoustical insulation and vibration dampening materials can have an exaggerated insulation thickness and be evacuated to a thinner section until after final installation in the below-counter, cabinet opening. Once assembled to the dishwasher and the dishwasher installed in its prepared opening, then air can either be reintroduced into the sealed pouch by a forced application by way of a blower or ambient air can simply be allowed to flow into the opening in a result of either method being to return the foam thickness back to its original size thereby tightly filling the space between the dishwasher and the cabinet work.

It is also to be understood that when the insulation blanket (see FIG. 8) is constructed such that the individual panels are separate and distinct (sealing along fold lines 88, 89 and 90), a nozzle or opening can be provided in any one or all of the individual insulation panel portions such that these individual panels, namely the left and right side panels, the top panel and the rear panel can be individually and selectively filled with different thicknesses of insulation and can be individually and selectively evacuated for a thinner cross-section at the time of assembly. The versatility afforded in the evacuation of individual panels or pouches is consistent with the versatility afforded by the lamination construction and versatility afforded by varying materials which can be used for acoustical insulation, vibration dampening and thermal insulation, all depending on the particular make and model of appliance and the particular environment.

Figure 14:
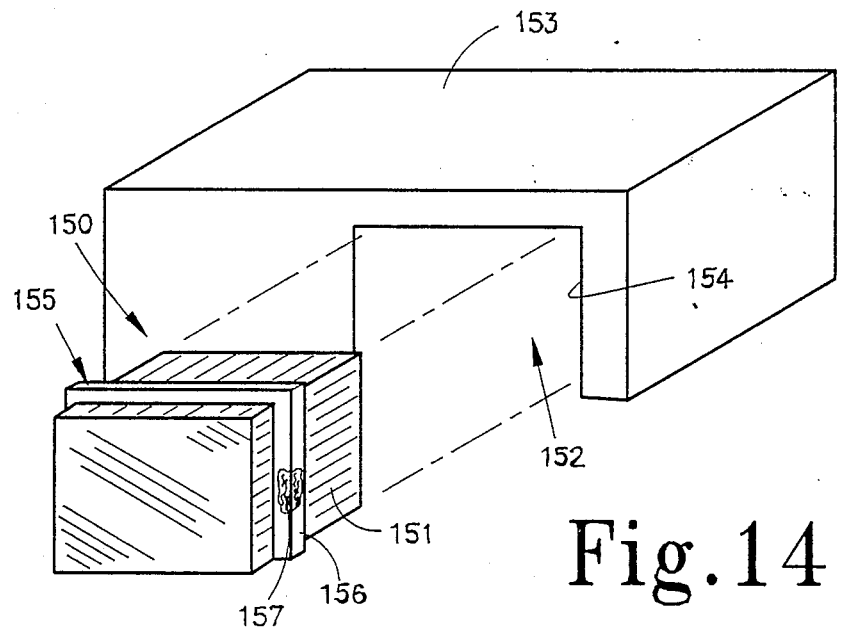
FIG. 14 is an exploded, perspective diagrammatic representation of the installation of a dishwasher appliance incorporating a sealing and insulating device.
Figure 15:
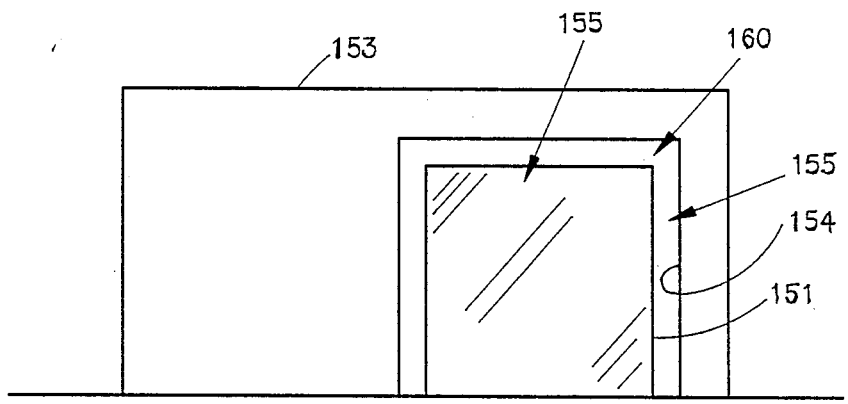
FIG. 15 is a front view of the dishwasher appliance of FIG. 14 is installed in a confined space in a kitchen cabinetwork.
Figure 13:
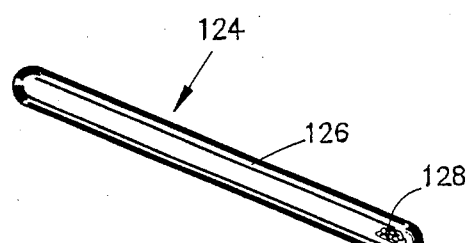
FIG. 13 is a diagrammatic, perspective representation of the sealing and insulating device of FIG. 9.

Now with more specific reference to FIGS. 14 and 15, there is shown a dishwasher apparatus 150 having a housing 151 which is to be installed within the confines of an opening 152 formed in a kitchen cabinetwork 153. The exterior surface of the dishwasher housing 151 can be considered a first surface of two spaced-apart surfaces, and the edge 154 of the opening 152 can be considered to be a second surface of the two spaced-apart surfaces.

A sealing and insulation device 155 is shown as comprising a closed elongated envelope 156 fabricated of a resilient, gas-impermeable material. The material can be, for example, a thermoplastic film such as polyethylene film or polypropylene film. The closed envelope 156 is filled with a resilient insulation material 157 such as interengaged or non-interengaged fibrous material, for example, fiberglass, mineral wool, cellulose, ceramic fiber, or divided, discrete particles of material, for example, beads of plastic foam or resilient foam such as flexible urethane foam and the like. The specific insulation material used will be a function of the end use of the environment. In this regard, the insulation material can be more generally thought of as a reducing material whose composition is selected depending upon which undesirable side effects of the dishwasher are being material whose composition is selected depending upon which undesirable side effects of the dishwasher are being addressed. If noise absorption or reduction is a concern then the insulation material (reducing material) is selected principally for noise abatement results. Similarly, if one of the objectives is vibration-dampening, then the material enclosed within elongated envelope 156 is selected for that purpose. Finally, if thermal insulation is important such as placement of the envelope over a heat source, then the reducing material selected should have good thermal insulating properties. It is also possible as previously described in this application to combine different materials so that a combination of undesirable side effects can be addressed by a single insulation device 155.

The length of the envelope 156 of sealing and insulating device 155 is sufficient to overlay the two sides and top of the dishwasher housing 151. The thickness or width dimension of the envelope 156 is at least equal to the transverse dimension of the space 160 between the first or exterior surface of the dishwasher housing 151 and the second or edge 154 of the opening 152 so as to be in abutting contact with both the first and second surfaces across space 160.

With continued reference to FIGS. 14 and 15, the sealing and insulating device 155 is positioned on the exterior surface of the dishwasher housing 151 overlying the two sides and top surface of the housing. The sealing and insulation device can be attached directly to the dishwasher housing by, for example, an adhesive or tape if desired or required to keep the insulation device from moving or shifting. Next, air is evacuated from the interior of the sealing and insulation device 155 in order to shrink it and reduce the thickness or width dimension to a dimension which is less than the width of space 160. The removal of air can be accomplished in the manner previously described with regard to the insulation device used in the hot water heater. The dishwasher apparatus 150 is then positioned within the opening 152 of the cabinetwork. The vacuum pump used to remove the air from the insulation device can be reversed or alternatively a flexible hose 134 can be connected to an air pump in order to introduce air back into envelope 156. A still further alternative is to simply leave a small opening in the sealing and insulation device and allow ambient air to be introduced or reinter the envelope 156 so that it returns back to at least its original size such that it is in abutting contact with both the exterior surface of the dishwasher apparatus housing and the edge 154 of the cabinetwork opening across space 160.

It is further contemplated that in some situations it will not be necessary to seal any pierced holes in the insulation device after the air has been evacuated and the flexible hose removed. This possibility exists with pierced holes that are sufficiently small so as to retard the inflow of ambient air into the insulation device. If the installer after pulling a vacuum on the insulation device promptly completes installation of the dishwasher into the cabinetwork opening, the insulation device will not have had sufficient time to expand back to its full size due solely to the unaided flow of ambient air.

When it is necessary to remove the dishwasher for servicing, the vacuum can be reapplied to the insulation device so as to reduce its thickness and thereby take it out of abutment contact with the cabinetwork opening. Once the vacuum is drawn on the insulation device, the dishwasher may be easily removed and serviced and then the process repeated for reinstallation of the dishwasher into the cabinetwork opening.

Throughout all variations or permutations of the present invention, and regardless of the material selected and regardless of the insulation panel sizes and designs, what is provided is an encased and sealed insulation package where prior concerns over handling and inhaling particulate fiberglass are eliminated, concerns over the insulation blanket tearing or rolling upon packaging or installation are eliminated and manufacturing convenience and simplicity greatly enhanced in that the desired insulation panels can all be prefabricated and tailored to specific makes and models of appliances and can be selectively designed to address specific acoustical, vibrational and thermal concerns thereby creating a near-perfect final assembly of insulation panels, insulation material and appliance.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of fabricating an insulation panel for use on an appliance for reducing one or more undesirable side effects caused by the operation of said appliance, said method comprising the following steps:
    (a) preparing a first layer of enclosing material that corresponds to the size and shape of the appliance area to be covered;
    (b) applying a first layer of loose, discrete insulation material onto said first layer of enclosing material in a blanket of substantially uniform thickness;
    (c) applying an intermediate insulation pad onto said blanket of substantially uniform thickness of said discrete insulation material;
    (d) applying a second layer of loose, discrete insulation material over said intermediate insulation pad in a blanket of substantially uniform thickness;
    (e) introducing a binder into said insulation material;
    (f) preparing a second layer of enclosing material which has a size and shape which is substantially the same as said first layer;
    (g) laminating said second layer onto said blanket of insulation material; and
    (h) joining the edge peripheries of said first and second layers of enclosing material so as to define an enclosed cavity.

2. An insulation panel for an appliance for reducing one or more undesirable side effects due to the operation of the appliance such as noise, vibration and heat, said insulation panel comprising:

a first layer of enclosing material having a peripheral edge of a predetermined shape;

a second layer of enclosing material having a peripheral edge of a predetermined shape which is substantially the same as the shape of the peripheral edge of said first layer of enclosing material;

an intermediate insulation pad disposed between said first and second layers;

a first portion of loose, discrete insulation material disposed between said first layer of enclosing material and said intermediate insulation pad;

a second portion of loose, discrete insulation material disposed between said second layer of enclosing material and said intermediate insulation pad;

said first and second layers being joined together along their peripheral edges so as to define an enclosed cavity, said intermediate insulation pad thereby being retained in said enclosed cavity; and binder material dispersed in said enclosed cavity and cooperating with said first and second portions of loose, discrete insulation material so as to prevent the shifting of said discrete insulation material within said enclosed cavity.

3. The insulation panel of claim 1 wherein said first and second layers of enclosing material are fabricated of synthetic material.

4. The insulation panel of claim 3 wherein said insulation material is fiberglass.

5. The insulation panel of claim 2 wherein said first and second layers of enclosing material are fabricated of polyethylene, said insulation material is fiberglass and said binder is phenolic or sodium silicate.

6. The insulation panel of claim 2 which further includes an exterior insulation pad secured to the exterior surface of said first layer of enclosing material.

7. An insulation panel for an appliance for reducing one or more undesirable side effects due to the operation of the appliance such as noise, vibration and heat, said insulation panel comprising:

a first layer of synthetic enclosing material having a peripheral edge of a predetermined shape;

a second layer of synthetic enclosing material having a peripheral edge of a predetermined shape which is substantially the same as the shape of the peripheral edge of said first layer of enclosing material;

an intermediate insulation pad disposed between said first and second layers;

a first portion of loose, discrete insulation material disposed between said first layer of synthetic enclosing material and said intermediate insulation pad;

a second portion of loose, discrete insulation material disposed between said said second layer of synthetic enclosing material and said intermediate insulation pad; and said first and second layers being joined together along their peripheral edges so as to define an enclosed cavity, said intermediate insulation pad thereby being retained in said enclosed cavity.

8. The insulation panel of claim 7 wherein the predetermined shape of each layer is generally T-shaped with four panels suitably sized and arranged to fit the sides, top and rear portions of a below-counter dishwasher.

9. The insulation panel of claim 7 wherein said first and second layers of synthetic enclosing material are fabricated from polyethylene.

10. The insulation panel of claim 7 wherein said insulation material is fiberglass.

11. The insulation panel of claim 10 wherein said first and second layers of synthetic enclosing material are fabricated from polyethylene.

12. In combination:

an under-the-counter, in-cabinet automatic dishwasher; and an insulation panel cooperatively applied to said dishwasher for noise reduction, said insulation panel comprising:

a first layer of enclosing material having a peripheral edge of predetermined shape;

a second layer of enclosing material having a peripheral edge of predetermined shape which is substantially the same as the shape of the peripheral edge of said first layer of enclosing material;

an intermediate insulation pad disposed between said first and second layers;

a first portion of loose, discrete insulation material disposed between said first layer of enclosing material and said intermediate insulation pad;

a second portion of loose, discrete insulation material disposed between said said second layer of enclosing material and said intermediate insulation pad; and said first and second layers being joined together along their peripheral edges so as to define an enclosed cavity, said intermediate insulation pad thereby being retained in said enclosed cavity.

13. The combination of claim 12 wherein said first and second layers of enclosing material are fabricated of synthetic material.

14. The combination of claim 13 wherein said insulation material is fiberglass.

15. The combination of claim 12 which further includes an exterior insulation pad secured to the exterior surface of said first layer of enclosing material.

16. The combination of claim 12 which further includes a binder material dispersed into said first and second portions of loose discrete insulation material so as to prevent the shifting of said insulation material.

17. The combination of claim 16 wherein said first and second layers of enclosing material are fabricated of polyethylene, said insulation material is fiberglass and said binder is phenolic or sodium silicate.

18. An insulation panel for an appliance for reducing one or more undesirable side effects due to the operation of the appliance such as noise, vibration and heat, said insulation panel comprising:

a first layer of enclosing material having a peripheral edge of a predetermined shape;

a second layer of enclosing material having a peripheral edge of a predetermined shape which is substantially the same as the shape of the peripheral edge of said first layer of enclosing material;

an intermediate layer of loose, discrete insulation material disposed between said first and second layers;

a panel of insulation material secured to the exterior surface of said first layer of enclosing material;

said first and second layers of enclosing material being joined together along their peripheral edges so as to define an enclosed cavity, said discrete insulation material thereby being retained in said enclosed cavity; and binder material dispersed in said enclosed cavity and cooperating with said discrete insulation material so as to prevent the shifting of said discrete insulation material within said enclosed cavity.

19. The insulation panel of claim 18 which further includes a second panel of insulation material disposed between said first and second layers of enclosing material and arranged with loose, discrete insulation material disposed on each side thereof.

20. In combination:
   an under-the-counter, in-cabinet automatic dishwasher; and
   an insulation panel cooperatively applied to said dishwasher for noise reduction, said insulation panel comprising:
   a first layer of enclosing material having a peripheral edge of a predetermined shape;
   a second layer of enclosing material having a peripheral edge of a predetermined shape which is substantially the same as the shape of the peripheral edge of said first layer of enclosing material;
   an intermediate layer of loose, discrete acoustical insulation disposed between said first and second layers;
   a panel of insulation material secured to the exterior surface of said first layer of enclosing material; and
   said first and second layers being joined together along their peripheral edges so as to define an enclosed cavity, said discrete acoustical insulation being retained in said enclosed cavity.

21. The combination of claim 20 which further includes a second panel of said second insulation material disposed between said first and second layers of enclosing material and arranged with loose, discrete insulation material disposed on each side thereof.

22. An insulation panel for a appliance for reducing one or more undesirable side effects due to the operation of the appliance such as noise, vibration and heat, said insulation panel comprising:
   a first layer of synthetic enclosing material having a peripheral edge of a predetermined shape;
   a second layer of synthetic enclosing material having a peripheral edge of a predetermined shape which is substantially the same as the shape of the peripheral edge of said first layer of enclosing material;
   an intermediate insulation pad disposed between said first and second layers;
   a first layer of insulation material disposed between said first layer of synthetic enclosing material and said intermediate insulation pad;
   a second layer of discrete insulation material disposed between said said second layer of synthetic enclosing material and said intermediate insulation pad; and
   said first and second layers of synthetic enclosing material being joined together along their peripheral edges so as to define an enclosed cavity, said intermediate insulation pad thereby being retained in said enclosed cavity.

23. In combination:
   an under-the-counter, in-cabinet automatic dishwasher; and
   an insulation panel cooperatively applied to said dishwasher for noise reduction, said insulation panel comprising:
   a first layer of synthetic enclosing material having a peripheral edge of a predetermined shape;
   a second layer of synthetic enclosing material having a peripheral edge of a predetermined shape which is substantially the same as the shape of the peripheral edge of said first layer of enclosing material;
   an intermediate insulation pad disposed between said first and second layers;
   a first layer of insulation material disposed between said first layer of enclosing material and said intermediate insulation pad;
   a second layer of insulation material disposed between said said second layer of enclosing material and said intermediate insulation pad; and
   said first and second layers of synthetic enclosing material being joined together along their peripheral edges so as to define an enclosed cavity, said intermediate insulation pad thereby being retained in said enclosed cavity.

24. In combination:
   an insulation panel comprising:
   a first layer of enclosing material having an eight-sided, block-T shape;
   a second layer of enclosing material having an eight-sided, block-T shape; and
   an intermediate layer of insulation material disposed between said first and second layers of enclosing material; and
   an automatic dishwasher wherein said insulation panel is formed over and around the exterior of said dishwasher so as to apply insulation to four different surfaces of said dishwasher.

* * * * *

UNITED STATES PATENT AND TRADEMARK OFFICE
CERTIFICATE OF CORRECTION

PATENT NO. : 4,985,106

DATED : January 15, 1991

INVENTOR(S) : Thomas E. Nelson

It is certified that error appears in the above-identified patent and that said Letters Patent is hereby corrected as shown below:

In column 7, line 52, please change "23" to --33--.
In column 7, line 61, before "material" insert --insulation--.
In column 7, line 62, delete "insulation".
In column 7, line 68, change "dampening vibration materials insulation" to --vibration dampening insulation materials--.

In column 8, line 4, please insert --vibration-- before "transmission".
In column 8, line 5, please delete --vibration--.
In column 8, line 36, please change "barrier vibration" to --vibration barrier--.
In column 8, line 37, please change "material insulation" to --insulation material--.
In column 11, line 59, please change "light" to --eight--.
In column 15, line 59, please insert --or-- before the word "interior".
In column 17, line 68, please delete the words "This possibility exists with".
In column 18, line 1, please delete the words "pierced hose removed.".
In column 19, line 26, please change "1" to --2--.

Signed and Sealed this

Third Day of November, 1992

*Attest:*

DOUGLAS B. COMER

*Attesting Officer*    *Acting Commissioner of Patents and Trademarks*

REEXAMINATION CERTIFICATE (3231st)

United States Patent [19]

Nelson

[11] B1 4,985,106
[45] Certificate Issued Jun. 17, 1997

[54] INSULATION STRUCTURE FOR APPLIANCES

[75] Inventor: Thomas E. Nelson, Anchorage, Ky.

[73] Assignee: Soltech, Inc., Shelbyville, Ky.

Reexamination Request:
No. 90/004,068, Dec. 27, 1995

Reexamination Certificate for:
Patent No.: 4,985,106
Issued: Jan. 15, 1991
Appl. No.: 220,027
Filed: Jul. 15, 1988

Certificate of Correction issued Nov. 3, 1992.

Related U.S. Application Data

[63] Continuation-in-part of Ser. No. 931,150, Nov. 17, 1986, abandoned, and a continuation-in-part of Ser. No. 177,439, Apr. 4, 1988.

[51] Int. Cl.[6] ...................................................... B32B 31/00
[52] U.S. Cl. ......................... 156/276; 53/431; 53/452; 53/467; 53/469; 53/474; 156/146; 156/227; 156/292; 312/229; 312/237; 312/242; 428/76
[58] Field of Search .................................... 156/276, 146, 156/227, 292; 53/431, 469, 452, 474, 467; 428/76; 52/809; 312/229, 242, 237; 134/585

[56] References Cited

U.S. PATENT DOCUMENTS

| | | |
|---|---|---|
| D. 137,145 | 1/1944 | Koppel . |
| D. 174,534 | 4/1955 | Duncan . |
| D. 174,535 | 4/1955 | Duncan . |
| 1,880,153 | 9/1932 | Rosenzweig . |
| 1,888,841 | 11/1932 | Wenzel et al. . |
| 1,923,195 | 8/1933 | Finck . |
| 1,949,677 | 3/1934 | Crawford . |
| 2,013,914 | 9/1935 | Hartmann . |
| 2,216,809 | 10/1940 | Derby . |
| 2,365,086 | 12/1944 | Kamowski . |
| 2,700,633 | 1/1955 | Bovenkerk .................. 156/292 |
| 2,795,020 | 6/1957 | Kintz . |
| 2,817,124 | 12/1957 | Dybirg . |
| 2,927,626 | 3/1960 | Corwin et al. .................. 156/281 |
| 2,939,811 | 6/1960 | Dillon . |
| 3,056,708 | 10/1962 | Ball . |
| 3,502,843 | 3/1970 | Stryer . |
| 3,730,144 | 5/1973 | Arberger . |
| 3,850,789 | 11/1974 | Walls et al. . |
| 3,933,398 | 1/1976 | Haag . |
| 4,039,098 | 8/1977 | Stilts . |
| 4,269,890 | 5/1981 | Breitling et al. . |
| 4,282,279 | 8/1981 | Strickland . |
| 4,318,427 | 3/1982 | Cross .................. 428/76 |
| 4,350,001 | 9/1982 | Shishoo .................. 53/431 |
| 4,372,028 | 2/1983 | Clark et al. . |
| 4,385,477 | 5/1983 | Walls et al. . |
| 4,403,023 | 9/1983 | Reiss . |
| 4,447,377 | 5/1984 | Denton . |
| 4,477,399 | 10/1984 | Tilton . |
| 4,510,890 | 4/1985 | Cowan . |
| 4,739,781 | 4/1988 | Casoli . |

FOREIGN PATENT DOCUMENTS 2432196  3/1980  France .................. 181/290

*Primary Examiner*—John J. Gallagher

[57] ABSTRACT

An insulation panel for an appliance for reducing one or more undesirable side effects due to the operation of the appliance such as noise, vibration and heat includes a first layer of enclosing material such as polyethylene or polypropylene which has greater tear resistance and configuring this first layer of enclosing material to a size and shape based upon the appliance and the area of the appliance to be covered. Next, a second layer of similar enclosing material is selected and configured so as to having a matching peripheral edge or contour with the first layer. Ultimately these two layers of enclosing material are joined together around their peripheral edges so as to define and completely enclose an interior cavity. Into this interior cavity a blanket of insulating material is dispersed of a generally uniform blanket thickness. In certain applications, the insulating material includes a binder so that the insulating material will not shift or settle relative to the enclosed cavity. The particular insulating material may either be selected for acoustical insulation, vibration dampening and/or thermal insulation. A singular purpose of the insulating material may be desired or multiple uses may be desired in which case part of the enclosed cavity may include acoustical insulation and part of the enclosed cavity may include vibration-dampening material.

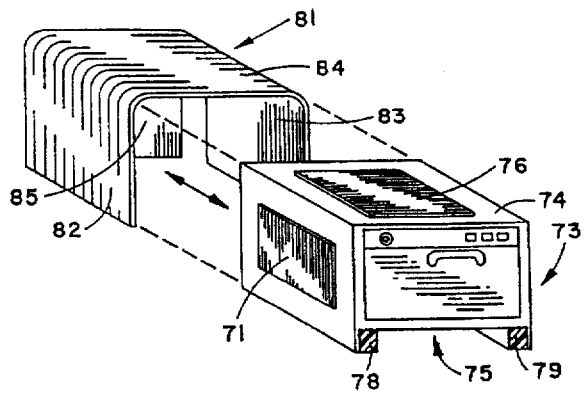

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 16, lines 40–57:

It is also to be understood that when the insulation blanket (see FIG. 8) is constructed such that the individual panels are separate and distinct (sealing along fold lines 88, 89, and 90), a nozzle or opening *81a* can be provided in any one or all of the individual insulation panel portions such that these individual panels, namely the left and right side panels, the top panel and the rear panel can be individually and selectively filled with different thicknesses of insulation and can be individually and selectively evacuated for a thinner cross-section at the time of assembly. The versatility afforded in the evacuation of individual panels or pouches is consistent with the versatility afforded by the lamination construction and the versatility afforded by varying materials which can be used for acoustical insulation, vibration dampening and thermal insulation, all depending on the particular make and model of appliance and the particular environment.

THE DRAWING FIGURES HAVE BEEN CHANGED AS FOLLOWS:

Reference numeral 81a added to FIG. 8.

AS A RESULT OF REEXAMINATION, IT HAS BEEN DETERMINED THAT:

The patentability of claims 1–23 is confirmed.

Claim 24 is determined to be patentable as amended.

New claim 25 is added and determined to be patentable.

24. In combination:
an insulation panel comprising:
a first layer of enclosing material having an eight-sided, block-T shape;
a second layer of enclosing material having an eight-sided, block-T shape; and
an intermediate [layer] *pad of fibrous* insulation material disposed between said first and second layers of enclosing material; and
an *under-the-counter,* automatic dishwasher wherein said insulation panel is formed over and around the exterior of said dishwasher so as to apply insulation to four different surfaces of said dishwasher.

25. *In combination:*
*an insulation panel comprising;*
*a first layer of enclosing material having an eight-sided, block-T shape;*
*a second layer of enclosing material having an eight-sided, block-T shape; and*
*an intermediate layer of insulation material disposed between said first and second layers of enclosing material;*
*an under-the-counter, automatic dishwasher wherein said insulation panel is formed over and around the exterior of said dishwasher so as to apply insulation to four different surfaces of said dishwasher; and*
*said first and second layers of enclosing material defining an interior space therebetween and said insulation panel including an opening for establishing air flow communication between the atmosphere and said interior space.*

\* \* \* \* \*